3,838,092
DUSTLESS COMPOSITIONS CONTAINING FIBEROUS POLYTETRAFLUOROETHYLENE
John W. Vogt, South Russell, and James E. Owen, South Euclid, Ohio, assignors to Kewanee Oil Company, Bryn Mawr, Pa.
No Drawing. Continuation-in-part of abandoned application Ser. No. 136,268, Apr. 21, 1971. This application Dec. 20, 1972, Ser. No. 316,872
Int. Cl. C08f 45/04
U.S. Cl. 260—33.6 F
6 Claims

ABSTRACT OF THE DISCLOSURE

A process for the control of dust generated by normally dusty solid particulate material smaller than 10 mesh in size, comprising mixing from about 0.02 to less than 1.0 percent, and preferably from about 0.02 to about 0.75 percent, by weight, fibrillatable polytetrafluoroethylene (hereinafter referred to as PTFE) with said material to form an intimate mixture and then working the mixture sufficiently at a temperature above 20° C., but below the transition point of said PTFE to form enough PTFE fibers to produce a weak, essentially dustless agglomerate from said dusty material.

A coherent, weak agglomerated dustless solid particulate mass lacking resistance to pressure of mechanical shock and simultaneously pliable and friable at ambient temperatures, yet visually distinguishable from the normally dusty material from which it is formed. The agglomerate is formed from a mixture of dusty discrete particles in the size range from less than about 1 micron to about 2000 microns, and fibrillatable PTFE in an amount from about 0.02, but less than 1 percent by weight, based on total solids, by working the mixture in a dry or relatively dry state with a working action in an unconfined zone at a temperature in excess of 20 C., but below the sintering temperature of PTFE, without changing the primary particles size range of the material.

CROSS-REFERENCE TO RELATED APPLICATION

This is a continuation-in-part application of our copending application Ser. No. 136,268, filed Apr. 21, 1971 now abandoned.

BACKGROUND OF THE INVENTION

It is common practice, and has been for many years, to pelletize solid, particulate dusty materials for storing, handling and transporting the materials. Dusty materials, referred to herein, include solid particulate matter which is reduced to minute portions as in a fine powder, and normally dusty materials refer to those powders which generate dust when they are transferred from one container to another. Normally dusty materials are exemplified by finely ground silica less than 325 Tyler mesh in size, finely ground pigments, flour, talc, clay, particulate electrodeposited metals and metal oxides, carbon black, various forms of activated carbon, and the like. In general, all finely divided powders with a significant superfines content, having particles less than about 37 microns in size, which exhibit a notorious proclivity to dust are usually referred to in industry as normally dusty materials or normally high-dusting materials. It is to all dusty materials that the article of manufacture of this invention is directed.

Pelletizing of dusty material is commonly effected from a fluid paste or a slurry incorporating a binder, in what is referred to as a "wet" process. Typically, a paste of a liquid binder and particulate material is extruded through a die to yield an extrudate, or strands of a thick paste are formed on a grooved drum. The extrudate or strands are thereafter chopped to provide dense, damp pellets of predetermined size. The damp pellets are subsequently dried into relatively small shapes, not necessarily regular, from about ⅛" to about ½" in diameter. The dried pellets, because of the cohesive effect of the binder, are relatively strong and can withstand considerable pressure. For example, dense, dried pellets at the bottom of a 55-gallon drum will normally retain their shapes with only minor attrition. When dense pellets break, due to mechanical shock, they tend to shatter.

The agglomerate of the instant invention may be formed in the dry state, without the benefit of a liquid binder. Where, for convenience in processing, a liquid dispersing medium is used to effect a homogeneous dispersion of fibrillatable PTFE in a normally dusty material prior to separating the liquid therefrom, and a small amount of residual liquid is left in the mixture, the mixture may nevertheless be worked effectively; the presence of residual liquid is unncessary during the working of the mixture to form the novel agglomerate.

Certain dusty materials, such as carbon black, lend themselves to agglomeration not only by a wet process referred to hereinabove, but also by a "dry" process in which, despite lack of a binder, a pellet is formed in which particle-to-particle adhesion is obtained by virtue of the relatively high bulk density of the pellet, usually from 1.5 to 5 times numerically greater than that of the dusty material in its normal quiescent state. Other materials, particularly powder metals and organic powders, are commonly tabletted in the dry state, often with a solid binder. A typical tablet, formed in the dry state, is an aspirin tablet. Pellets formed by the dry process have the obvious advantage of being free from contaminating binders and at the same time, because of their greater density, provide a shrunk volume which reduces shipping charges. PTFE resin is a known lubricant for tabletting a variety of particulate materials.

Processes for the formation of densified green articles with particle-to-particle adhesion, which articles are subsequently sintered or heat-treated, are unrelated to the process of this invention or to the novel agglomerate formed thereby. The novel agglomerate is not sintered and no attempt is made to invest it with that degree of structural integrity characteristics of pellets adapted to withstand handling and to maintain their shape during transportation by virtue of their density. Prior art agglomerates have been described as fragile and friable, though dense and rugged. The criterion of friability was generally set by the ability of the pellet to be incorporated into a mixture in heavy equipment, such as a Banbury mill, and the self-evident need for ruggedness was determined by the desirability of presenting the pellet to the mill without permittting it to disintegrate. In contrast, the need to which the instant process is directed is primarily to provide a dustless agglomerate substantially free of particle-to-particle adhesion, with essentially no structural integrity and which is at the same time both friable and pliable at ambient temperature and pressure conditions, as will be described more fully hereinafter. It will be recognized that the formation of the weak agglomerate of this invention has little in common with the formation of an agglomerate from a pasty, sticky or gummy resinous mass, or from a solid particulate mixture having a relatively large amount, greater than 1 percent by weight, of PTFE.

In the sense that the finely divided normally dusty powder is held together in an agglomerate without particle-to-particle adhesion, the binder in the instant invention is provided by a matrix of microscopic and submicroscopic fibers of fibrillatable fine powder PTFE resin which is a homopolymer of tetrafluoroethylene in the form of spheroidal porous aggregates with an average diameter of about 450 microns. Commonly available granular molding powder of PTFE resin is not fibrillatable and is ineffective to form the desired matrix.

U.S. Pat. No. 3,005,795 discloses synthetic polymeric resin mixtures of normally rigid thermoplastic polymers which contain small amounts of fine, fibrous particles of fibrillatable polytetrafluoroethylene resin incorporated by milling the molten resin with from 0.05 to 20 percent by weight of PTFE. Polymers modified with PTFE exhibit higher melt elasticity than the unmodified polymers and are more suitable in forming operations, such as wire coating, extrusion and thermoforming.

U.S. Pat. No. 3,326,731 discloses a plastic explosive composition which utilizes from 5 to 25 percent by weight of PTFE resin. The plastic explosive composition formed is pliable, surprisingly strong and can be inelastically extended 50 percent or more.

U.S. Pat. Nos. 3,455,749 and 3,466,204 disclose a plastic explosive composition and a process for making it in which PTFE in the range from 1–5 percent by weight is usually sufficient to give compositions which can be formed in coherent plastic state under very light compression and which have a consistency somewhat resembling the confection known as marshmallow. These mucilaginous, soft, creamy and pliable compositions are not friable.

British Pat. No. 891,537 discloses the use of PTFE as a binding agent, by itself or in combination with other binding agents. The binding agents may be added at any convenient stage, as for example, to an aqueous slurry of a particulate powder to form an aqueous suspension from which most of the water is removed to form a paste. The paste so obtained may be shaped into pellets, granules and other agglomerated forms in any manner known in the art, for example, by extrusion through a die, or by forming on a grooved drum. The proportion of binding agent to be employed may be in the range from 0.05 to 12 percent of the weight of the powdered organic chemical substance which is pelleted.

The physical properties of known compositions with PTFE contents in the range 1–5 percent by weight are surprisingly different from the properties of an agglomerate of normally dusty, material which contains less than 1 percent by weight PTFE, and preferably from about 0.02 to about 0.75 percent by weight, based on total solids. For example, a relatively large agglomerate is weak, pliable and easily deformed under light pressure between a person's fingers; it has essentially no stability of shape where a multiplicity of agglomerates are stored in a large receptacle, such as a drum, bin or hopper, or are transmitted in a shipping container. Although agglomerates of this invention are typically small, i.e., ¼" average diameter or less, they posses the same characteristics and properties.

Again, known compositions containing in excess of 5 percent by weight PTFE have physical properties, for example, surprising strength and inelastic extensibility greater than 50 percent, which are quite unlike the combination of weak, friable and characteristically tearable properties of the agglomerate of this invention. Significantly, this combination of properties, heretofore deemed undesirable in a transportable agglomerate, imbue the agglomerate with an essentially total freedom from dusting and exceptional dispersibility in other materials.

SUMMARY OF THE INVENTION

It has been discovered that a small amount of fibrillatable PTFE in a range from about 0.02 to less than 1 percent by weight, based on total solids, may be dispersed in a normally dusty, finely divided solid material to form an intimate mixture which, when subjected to a sufficient amount of working, forms enough PTFE fibers or fibrils to hold at least several particles of the material in a weak agglomerate distinguishable from the normally dusty materials.

It has also been discovered that a dust-free agglomerate of irregular shape may be formed from a normally dusty powder by mixing the dusty powder with less than 1 percent by weight, based on total solids of fibrillatable PTFE, to form an intimate mixture and then subjecting the mixture to a compressive shearing action at, or preferably above, room temperature to form a random matrix of submicroscopic and microscopic PTFE fibers. The fibers or fibrils serve to agglomerate the normally dusty particulate material into a weak, coherent, irregularly shaped mass visually distinguishable from the normally dusty material, having suprising characteristics peculiarly adapted to utilizing the material for a specific purpose, namely, its easy dust-free dispersibility.

It is an object of this invention to provide a small article of manufacture, typically less than about 0.25" in diameter, and preferably less than 0.125" average diameter, which consists essentially of particles of normally dusty material, cohesively held without particle-to-particle adhesion as a weak agglomerate in a dry or relatively dry state, in a matrix of PTFE fibers. Through less than 1 percent by weight PTFE is included in the agglomerate, the working action to which the normally dusty material is subjected renders it dustless. Surprisingly, this working action also renders the agglomerate pliable and weak; typically, it has no conventionally measurable tensile strength. The agglomerate is easily dispersed in other materials because it is friable; typically, it may be fragmented by the simple expedient of placing the agglomerate on a sieve and vibrating the sieve.

A particular application of the above discovery is embodied in the formation of a porous activated carbon agglomerate having high crude-oil absorptive capacity, in which is incorporated less than 1 percent fibrillatable PTFE, by working the mixture, without noticeably changing the primary size of the carbon particles, to form an agglomerate with essentially no particle-to-particle adhesion. The particles are held in a weak matrix of PTFE fibers.

DETAILED DESCRIPTION OF THE INVENTION

In all embodiments of the instant invention, only a fibrillatable form of PTFE resin may be used. As has been indicated hereinbefore, the commonly available form of PTFE resin, namely granular molding powder, is ineffective in the process of the instant invention. Similarly, other carbonaceous polymers, such as other polyhalocarbons and known polyolefins, silicones and modifications thereof, are incapable of providing a comparable, readily friable agglomerate with substantially no particle-to-particle adhesion. A fibrillatable form of PTFE is presently restricted to two commercially available types of resin. A first type is a colloidal aqueous dispersion concentrated to about 60% by weight of polymer having particles about 0.05 to about 0.5 microns in size, with average diameters of about $0.2\mu$. A second type, often referred to as "fine powder," is obtained by coagulation of the dispersion. This second type consists of agglomerates, with average diameters of $450\mu$, made up of primary particles ranging in size from 0.05 to $0.5\mu$ in diameter. Specific surface areas of PTFE fine powders are on the order of 10–12 $m.^2/g.$ with an average apparent powder density of 475 g./liter. These types of resin and their manufacture are more fully described in U.S. Pat. No. 2,559,752.

As we understand the influence of the fibrillatable form of PTFE in the suppression of the dusting problem, the essential factor is fibrillation of the PTFE in situ to generate a random network or matrix of microscopic and submicroscopic fibers which are distributed throughout a mass of dusty powder, entangling the primary, normally-high-dusting particles loosely in a shaped agglomerate, without particle-to-particle adhesion, so as to maintain the essential physical properties of the powder. Submicroscopic fibers or fibrils of the matrix are evident in a treated and worked normally-high-dusting powder under extreme magnification. The matrix of PTFE fibrils not only gives form to the agglomerate of this invention, but produces in the agglomerate peculiar and unobvious physical properties uniquely attributable to incorporating only a minute quantity of PTFE resin, less than 1 percent by weight, with normally dusty material, in an intimate, dry or relatively dry mixture, and to subjecting the mixture to a working action at elevated temperature.

While a pellet is a convenient form of the novel agglomerate, the shape of the agglomerate is not one of its important characteristics. Depending precisely on how it is formed, the shape of the agglomerate may be in flakes. Characteristically, however, the agglomerate is irregular in shape and isusually formed in a wide range of sizes. In a typical dusty material, an agglomerate may range from a few particles cohesively held together without particle-to-particle adhesion, the diameter of the agglomerate being about a micron to a sufficiently large number of particles similarly held together, the diameter of the agglomerate being about one-forth inch. The irregularity in shape and/or a change in texture of the agglomerates permits the mass to be visually distinguished from normally dusty material when each is in a quiescent state.

Depending upon the physical properties of the normally dusty material, the amount of PTFE mixed therewith, the extent to which the mixture is worked, and the size range of agglomerates formed, a mass of the agglomerates may or may not be free-flowing. In general, this mass will not be as free-flowing as the normally dusty material from which it is formed, and this noticeable change in characteristic permits it to be visually distinguished from the normally dusty material from which it is formed.

Depending upon the properties of the normally dusty material, particularly its size range and particle shape, an amount of PTFE as low as 0.02% by weight, when worked with the material, is found to form an agglomerate in which the dusting characteristics of the material are essentially eliminated; even lower concentrations of PTFE may form a shaped dust-free agglomerate, but the expense of working a mixture containing little more than a trace of PTFE will normally lead to the conclusion that such a small quantity of PTFE in the agglomerate is impractical. Again, an agglomerate may be formed containing at least 1 percent PTFE, but such an agglomerate will typically have measurable strength and not be easily friable.

In one embodiment of this invention, referred to as the "dry process," in a typical example, "fine powder" PTFE is preferably homogeneously dispersed in a pigment, which is then subjected to a working action which is a gentle shearing action with moderate compaction and moderate heating. It is not imperative that the fine powder PTFE be homogeneously dispersed in the pigment prior to being subjected to the working action described; however, since working a normally dusty material is critical to the formation of a matrix of PTFE fibers, it will be more difficult to form the agglomerate if all of the fine powder PTFE added is initially concentrated in a small portion of the dusty powder. A sufficiently intimate mixture of PTFE and dusty powder may be economically prepared by mixing dry powder with dry fine powder PTFE at a high rate of shear, for a short time, as for example, in a Waring blender, which has blades rotating at a speed in excess of 5000 r.p.m. The temperature at which this initial intensive mixing is effected is not critical; in most instances the temperature is the ambient storage temperature of the dusty powder and may range from below 0° C. in winter to above 49° C. in summer. The high-speed, high-shear work energy expended upon PTFE-treated dusty material during this short time, ranging from about 5 seconds to about 5 minutes, may not diminish the dusty character of the material. It will therefore be apparent that, though in most instances the time of intensive mixing is ordinarily less than a minute, the mixing vessel is preferably sealed to prevent the proliferation of clouds of dust.

The dry PTFE-treated dusty material obtained from the initial, intensive mixing stage, is thereafter subjected to a working action, at a temperature in the range from about 20° C. to about 200° C., in a relatively slow speed, low shear mixer. A desirable working or kneading action is provided by a slow-speed electrical mixer equipped with an impeller that smears the mixture on the walls of a small laboratory scale receptacle. On a larger production basis, a representative apparatus which provides a suitable working action is a slow-speed (60 r.p.m.) Sigma blade blender such as is used for the kneading of dough in a bakery, or a double cone blender, or a muller of the Simpson type adjusted for clearance so as to provide shear and mild compaction with a minimal amount of grinding so as to maintain the primary particle size range of the dusty material. The particular choice of working temperature depends upon the properties of the dusty material, the amount of PTFE used and the size of the agglomerate desired, but is less than the sintering temperature of PTFE or a temperature deleterious to the normally dusty material, whichever is lower. Working of the treated material is continued until a weak, pliable, coherent mass of loosely held particles is formed; further working of the coherent mass yields a multiplicity of agglomerates ranging in size from agglomerates of a few particles to globular agglomerates up to about 0.25" in diameter, and preferably less than 0.125" in diameter. The agglomerates have no measurable tensile strength or tear strength.

An intimate dry mixture of PTFE and normally dusty material, and working of the mixture may be simultaneously effected, particularly conveniently, in a steam-jacketed Littleford-Loedige blender having centrally disposed, high-speed propellers or "choppers" rotating at a speed in excess of 3000 r.p.m. and a separately controllable, slow-speed plow. In such a blender, depending on the characteristics of a dusty material, the amount of high-speed mixing and low-speed working may be individually adjusted to yield agglomerates of desired shape and size.

In the dry process described hereinabove, dry fine powder PTFE is mixed with dry dusty material. Where PTFE in an amount less than 1 percent by weight, based on total solids, is added as the commercially available aqueous suspension referred to hereinbefore, so little moisture is present in the mixture that it is essentially dry; that is, for all practical purposes, it is dry and is worked as a dry mixture.

As mentioned hereinbefore, it is preferred that fibrillatable PTFE be homogeneously dispersed in the normally dusty powder prior to working the PTFE-treated material. Obtaining such a homogeneous dispersion in the dry state may be inconvenient, if not difficult in many instances, due to mixing and dusting problems. A convenient method of obviating the problem of working a dry or essentially dry PTFE-treated mixture of solid particulate fines is to work the mixture of fines with more liquid. A sufficient amount of liquid is generally present for the purpose of the invention in a relatively dry, non-fluid mass with a liquids-to-solids volume ratio less than 0.2, and more preferably, less than 0.1. Such a relatively dry, non-fluid mass may be obtained by intensively mixing dusty material and a small amount of PTFE, less than 1 percent by weight, based on total solids, in a liquid slurry in which the duty material is wetted by the liquid but is essentially insoluble in it, and separating the solids by any conventional means so as to leave a minute quantity of residual liquid in the solids. A minute quantity of liquid is defined as an amount such that the solid particles in a mass confined under pressure do not move or change their relative position within the mass. Stated differently, the mass is non-fluid and appears to be relatively dry.

The amount of liquid in the slurry in which the dusty material and PTFE are initially intensively mixed is not critical, and serves merely quickly to effect dispersion of the PTFE in the mass of the dusty material. It will be recognized that, with a very small amount of liquid, less than that amount required to form a smooth fluid paste, a homogeneous mixture will be less conveniently effected than with a sufficient quantity of liquid to form an easily mixed slurry. Enough liquid is used to form a paste or slurry which when subjected to an intensive mixing action effects a homogeneous dispersion of the PTFE in the mixture. The type of mixer used, its action, and the speed at which it operates are unimportant as long as it intimately disperses the PTFE throughout the paste or slurry. Suitable industrial mixers are Hobart, Banbury, and Cowles models. During mixing, some incidental and initial fibrillation of the PTFE will generally be experienced, the extent of fibrillation depending upon the physical characteristics of the slurry, the amount of PTFE used, the type of mixer used to effect dispersion, the intensity of the mixing action, the temperature at which mixing is carried out, and the length of time over which it is effected. From a practical point of view, only sufficient energy is expended in mixing the slurry as is required to effect an intimate dispersion of the PTFE in the mixture.

In a subsequent step, the liquid is separated from the solid materials in the mixture by any liquid-solid separation means, such as filtration, centrifuging and the like. The solid material obtained is an essentially homogeneous, relatively dry mass, contaminated with residual liquid. The volume ratio of liquid-to-solids is less than 0.2, and generally less than 0.1, it being understood that, from a practical standpoint, the less residual liquid left, the better.

The relatively dry mass contaminated with residual liquid is formed into agglomerates by working the mass in a low speed mixer, as described hereinbefore, so as to form a matrix of PTFE fibers which loosely hold the particles in each agglomerate. It is critical that, whatever the mixing means used, the dry mass be subjected to a compressive shearing action in a zone in which there is relative movement between the particles of normally dusty material, when the entire mass is not tightly confined. For example, an adequate working action which subjects the mass to sufficient compressive shear may be generated by manually spatulating a small quantity of dry, or relatively dry, PTFE-treated material against the walls of a relatively large beaker at a suitable temperature above 20° C. On an industrial scale, relatively dry PTFE-treated material may be pelletized on a disc pelletizer, or in a Sigma blade blender such as is used for the kneading of dough in a bakery, or in a Hobart type mixer at a preselected temperature. It has been found that, particularly when a Hobart mixer is used, the working action to which the treated material is subjected produces a large, friable, agglomerated mass which, upon further working in the mixer, suddenly produces a "break" of the mass into a multiplicity of small agglomerates of relatively uniform shape. In all cases, the treated mass being worked is free to move away from the immediate zone in which particles of normally dusty material are subjected to the compressive shearing action of the mixing means.

The agglomerate of this invention is peculiarly adapted to facilitate the dispersion of finely divided particulate materials into other materials because of its weakness and especial friability. For example, in numerous instances when a normally dusty organic or inorganic pigment or filler is utilized with difficulty and inconvenience in the chemical process industries, the weak agglomerate of this invention fills a specific requirement, namely a dustless agglomerate which is easily dispersed. It is especially noteworthy that the ease of dispersion of this dustless agglomerate is predicated on its weakness. Beyond stating that the agglomerate has no toughness as evidenced by no measurable tear strength, and no measurable tensile strength, its weakness is difficult to quantify; as has been stated hereinbefore, this weakness is evidenced by ease of tearing, a remarkable lack of resistance to pressure, and essentially no stability of shape when transported in bulk. Yet, it is dust-free, pliable at ambient room temperature and so friable that a mass of agglomerates may be reduced to a powder by sieving them.

Where activated carbon is to be used for the absorption of oil spilled on water, agglomerates of the activated carbon produced by the methods described hereinabove are surprisingly effective in absorbing the oil. Where water-soluble, normally dusty particles are agglomerated, solution of the treated agglomerate particles may be delayed depending upon the amount of PTFE used, the extent of working, the primary particle size range, and the like, to provide controlled release of the particulate material into the water. Where clay, diatomaceous earth and the like are to be used for the absorption of cleaning fluids, agglomerates of this invention exhibit high absorptive capacity.

In all examples herein, reference to parts indicates parts by weight, unless otherwise specified.

EXAMPLE 1

100 parts of dry dusty yellow cadmium lithopone GL 40* pigment having a particle size from less than about 1 micron to about 10 microns are placed in a steam-jacketed Littleford-Loedige Mixer at room temperature of 20° C. and 0.30 part dry PTFE fine powder is added thereto. The mixer is equipped with centrally disposed variable speed propellers rotatable at a speed in the range from about 3000 to about 10,000 r.p.m., and a slow speed plow adjustably rotatable at a speed in the range from about 10 to about 180 r.p.m. A dust cover is secured tightly to confine the dusty pigment particles in the mixer. Mixing is commenced, the propellers rotating at about 3500 r.p.m. and the plow rotating at about 150 r.p.m., and continued for about 10 minutes, during which the PTFE is homogeneously dispersed throughout the normally dusty material. At the end of the 10 minutes, it is found that the PTFE-treated pigment is still dusty. Live low pressure steam is introduced into the steam jacket and the contents of the mixer are raised to a temperature of about 100° C., while the propellers continue mixing and the plow works the dusty material. After working the mixture for a period of 10 minutes at 100° C., the mixer is stopped, the dust cover is removed and it is seen that the normally dusty material is converted to a mass of weak agglomerates in the size range from a few microns to about ⅛″ in diameter.

EXAMPLE 2

Dry, dusty powders of potassium fluoborate ($KBF_4$) and potassium titanate ($K_2TiF_6$) having a sub-sieve primary particle size in the range from about 1 to about 35 microns are charged, in equal proportions by weight, to a ribbon blender at room temperature, and mixed until an essentially homogeneous dry mixture is formed. The blender is stopped and 0.1 percent by weight of dry fine powder Teflon® 6 PTFE is added to the dry mixture. The blender is re-started and blending is continued for 30 minutes to form an essentially homogeneous dispersion of PTFE in the dry, treated, powder mixture.

The treated powder mixture, which at this stage is dusty and indistinguishable from the starting materials, is transferred from the ribbon blender to a hot Raymond mill maintained at 100° C. The Raymond mill is a continuous hammer-mill which heats the material to 100° C. and subjects the treated powder to a sweeping centrifugal action which may not effect any noticeable agglomeration of the treated mixture. The hot material discharged from the Raymond mill is collected in drums and rolled to form a mass of weak small agglomerates. Globular agglomerates are also formed when the hot discharge of the Raymond mill is fed to a disc pelletizer.

---

*Designation of pigment by code letters and number listed in The Harshaw Chemical Co. catalogue entitled "Harshaw Pigment Colors."

EXAMPLE 3

Dry antimony oxide ($Sb_2O_3$) powder having a subsieve particle size in the range from less than a micron to about 15 microns (referred to as KR grade) is charged to a steam-jacketed Littleford-Loedige mixer at room temperature and 0.05 percent by weight dry fine powder Teflon® 6 PTFE is added thereto. Live steam at 180° C. is injected into the steam-jacket and, at the same time, both the high-speed blades and the slow-speed plow of the mixer are started. After mixing for 1 minute, the high-speed blades are stopped while the plow continues to work the mixture as it is heated. When the temperature of the mixture reaches 100° C., the steam to the jacket is shut off. The working action of the plow, rotating at about 60 r.p.m., smears the mixture against the bottom and the wall of the mixer with a compressive mildly shearing action. The plow is stopped after 5 minutes. A portion of the worked contents of the mixer, poured on a flat surface, displays a mass of small agglomerates ranging from a size barely visible to the naked eye, to about 0.125" in diameter. The agglomerates may be deformed into flat shapes by slight finger pressure.

Another portion of the mass of agglomerates formed in the mixer is weighed and placed on a U.S. standard 40 mesh screen and vibrated for 10 minutes. It is found that essentially all the agglomerates crumble into fragments which pass through the sieve; less than 3.4 percent by weight are retained on the screen.

EXAMPLE

The procedure of Example 1 hereinabove is repeated except that 0.50 part Teflon® 30 PTFE resin, which is an aqueous dispersion of PTFE containing about 60 percent solids, is added to the dusty material in place of the dry fine powder. As before, an initial mixing of 10 minutes at room temperature is provided. Upon removing the dust cover, it is found that the contents of the mixer are not noticeably less dusty than untreated normally dusty material, and though moisture introduced with the aqueous dispersion is present, the treated material is essentially dry, that is, it appears to be dry. As in the foregoing Example 1, the treated material is subjected to additional mixing and working at about 100° C. for 10 minutes. A mass of small weak agglomerates, less than about ⅛" in diameter is formed.

EXAMPLE 5

100 parts of the same dry yellow Cadmium lithopone GL 40 pigment, used in Examples 1 and 4 hereinabove, is added to 200 parts of water at about 15° C. in a mixing vessel equipped with a high-speed high-shear propeller mixer. Mixing is commenced to form a smooth slurry and 0.5 part Teflon® 30 PTFE resin is added to the slurry. Mixing is continued for a period of about 2 minutes, after which the mixer is stopped, the slurry is drained from the vessel and filtered to yield a damp filter cake. The filter cake is dried in an oven at a temperature below the transition temperature of PTFE until only a minute residue of liquid contaminates the filter cake. In general, the amount of liquid will be such that the liquid-to-solid ratio is less than about 5 percent by weight. The less liquid contaminant left the better, provided the filter cake is not dried to the extent that it is difficult to break up. In those instances where the cake is so dry that it is difficult to break up, the cake is hammer-milled; it will be recognized that, though the cake is hammer-milled, no noticeable reduction in primary particle size results; the effect of the hammer-mill is to break up the treated filter cake into a dusty powder generally not substantially less dusty than the untreated normally dusty material. The treated dusty material is worked at about 100° C. in a steam-jacketed Littleford-Loedige mixer as described in Example 1, and forms a mass of weak agglomerates. Working at temperatures higher than 100° C. will generally help the agglomerate form more quickly; however, a working temperature above about 200° C. but below the sintering temperature of PTFE, in most instances, will be economically unjustifiable. The terms "transition temperature" and "sintering temperature" have have been used hereinabove interchangeably with reference to a temperature of about 327° C. at which PTFE undergoes a characteristic change of structure.

Where the dried filter cake is contaminated with residual liquid in that it is only relatively dry, that is having less than about 5 percent by weight liquid, the cake is worked in the Littleford-Loedige Mixer at about 100° C. as described in Example 1, and after about 10 minutes forms a mass of small weak relatively dry agglomerates. The agglomerates may be further dried, if desired, but the properties of the agglomerate are generally unaffected. The agolmerates from about 0.020" to about 0.125" are easily deformed by light finger-pressure, have no tensile strength, and though tearable have no measurable tear strength.

EXAMPLE 6

Water is added to 300 gm. of normally dusty sodium silicofluoride ($Na_2SiF_6$) powder, 200 grind (essentially all passes through 200 mesh U.S. screen) while stirring, to form a smooth, mobile slurry. To the slurry is added 1.0 gm. Teflon® 30 PTFE resin (aqueous dispersion) containing about 0.60 gm. PTFE resin solids, and mixing is continued for an additional 30 seconds. The slurry is filtered under vacuum to yield a filter cake which is dried overnight in a forced-circulation oven at about 110° C. The dried filter cake, in the form of hard chunks, is run through a continuous hammer-mill in about 1 to about 2 minutes at room temperature of 20° C. to break up the cake and to commence the working of the PTFE-treated normally dusty powder. The material recovered from the hammer-mill is noticeably less dusty than the original dusty material through virtually indistinguishable from it in the quiescent state.

The powder is collected in a steel beaker and heated to about 100° C. and the beaker is rotated at an angle inclined from the horizontal for about a minute. The beaker is rolled until agglomerates of irregular shape are formed having a size in the range from 0.020" to about 0.25" in diameter. Temperatures higher than 100° C. may be used to speed up the formation of the agglomerates, but as for any other dusty material, the temperature should be below the melting point of the material, or its decomposition temperature, or in general, below a temperature deleterious to the material, if such a temperature is less than the transition temperature of the fibrillatable PTFE resin used.

We claim:

1. A dustless powdery agglomerate formed from a normally dusty material, said material having a primary particle size in the range from less than about 1 micron to about 400 microns, said agglomerate consisting essentially of a weak, coherent, porous, solid particulate mass of primary particles enmeshed in a matrix of microscopic and submicroscopic fibers of fibrillatable polytetrafluoroethylene resin present in an amount from about 0.02 to less than 1 percent by weight, based on total solids, said agglomerate having essentially no particle-to-particle adhesion and essentially no resistance to pressure or mechanical shock, which is both pliable and friable at ambient temperature, has no measurable tensile strength and no measurable tear strength, yet which characteristically tears rather than shatters, 2. The dustless powdery agglomerate of claim 1 wherein said polytetrafluoroethylene resin is fibrillatable at a temperature of at least 20° C. but below a temperature deleterious to said material or the sintering temperature of said resin, whichever is lower.

3. A dustless powdery agglomerate formed from a normally dusty material, said agglomerate comprising a coherent, porous, solid particulate mass formed by mixing fibrillatable polytetrafluoroethylene, in an amount in the range from about 0.02 to less than 1.0 percent by weight, based on total solids, with said dusty material to yield an intimate mixture and working said mixture at a temperature of at least 20° C., but below a temperature deleterious to said material or the sintering temperature of said polytetrafluoroethylene, whichever is lower, sufficiently to form enough polyeterafluoroethylene fibers to produce a weak agglomerate from said normally dusty material.

4. A dustless powdery agglomerate formed from a normally dusty material, said material having a primary particle size in the range from less than about 1 micron to about 400 microns, said agglomerate consisting essentially of a weak, coherent, porous, solid particulate mass having essentially no particle-to-particle adhesion and essentially no resistance to pressure or mechanical shock, which is both pliable and friable at ambient temperature, has no measurable tensile strength and no measurable tear strength, yet which characteristically tears rather than shatters, formed by mixing fibrillatable polytetrafluoroethylene, in an amount in the range from about 0.02 but less than 1 percent by weight, based on total solids, with said dusty material, optionally in the presence of a liquid inert with respect to said dusty material and said polytetrafluoroethylene, to yield an intimate mixture, separating excess said liquid, if any, to yield a relatively dry mass having less than 10 percent liquid by volume of the mixture and working said mixture without noticeably changing the primary particle size, at a temperature of at least 20° C., but below a temperature deleterious to said material or the sintering temperature of said polytetrafluoroethylene, whichever is lower, sufficiently to produce enough polytetrafluoroethylene fibers to yield said agglomerate.

5. A dustless powdery agglomerate formed from a normally dusty material having a primary particle size smaller than 10 Tyler mesh, said agglomerate comprising a coherent, porous, solid particulate mass formed by mixing fibrillatable polytetrafluoroethylene, in an amount in the range from about 0.02 to about 0.75 percent by weight, based on total solids, with said dusty material to yield an intimate mixture having less than 10 percent liquid by volume of the mixture, and working said mixture without noticeably changing the primary particle size, at a temperature of at least 20° C., but below a temperature deleterious to said material or the sintering temperature of said polytetrafluoroethylene, whichever is lower, sufficiently to produce enough polytetrafluoroethylene fibers to yield said agglomerate visually distinguishable from said normally dusty material from which it is formed, said agglomerate having essentially no resistance to pressure or mechanical shock, no measurable tensile strength and no measurable tear strength, yet which characteristically tears rather than shatters, and is both pliable and friable at amibent temperature.

6. A substantially dustless powdery agglomerate comprising a normally dusty material other than polytetrafluoroethylene, defined by small, loose particles of said material and fibers of fibrillated polytetrafluoroethylene distributed through said loose particles, effective to render said material essentially dustless without changing the essential physical properties of said material.

References Cited

UNITED STATES PATENTS

| | | | |
|---|---|---|---|
| 3,466,204 | 9/1969 | Gow | 149—3 |
| 4,455,749 | 7/1969 | Gow | 149—3 |
| 2,559,752 | 6/1951 | Berry | 260—29.6 |

FOREIGN PATENTS

| | | |
|---|---|---|
| 891,537 | 3/1962 | Great Britain. |
| 930,093 | 7/1963 | Great Britain. |

ALLAN LIEBERMAN, Primary Examiner

R. ZAITLEN, Assistant Examiner

U.S. Cl. X.R.

260—41 A, 41 B, 900